(12) United States Patent
Rovekamp, Jr. et al.

(10) Patent No.: US 11,751,631 B2
(45) Date of Patent: **\*Sep. 12, 2023**

(54) AUTOMATIC RETENTION APPARATUS

(71) Applicant: Cincinnati Automation & Mechatronics, L.L.C., Beavercreek, OH (US)

(72) Inventors: Roger Neil Rovekamp, Jr., Kemah, TX (US); Keith Sawmiller, Beavercreek, OH (US)

(73) Assignee: Cincinnati Automation & Mechatronics LLC, Beavercreek, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,905

(22) Filed: Apr. 19, 2022

(65) Prior Publication Data

US 2023/0000210 A1 Jan. 5, 2023

Related U.S. Application Data

(63) Continuation of application No. 17/074,976, filed on Oct. 20, 2020, now Pat. No. 11,337,492, which is a
(Continued)

(51) Int. Cl.
*A43C 11/00* (2006.01)
*A63C 9/24* (2012.01)
(Continued)

(52) U.S. Cl.
CPC .............. *A43C 11/00* (2013.01); *A45F 3/047* (2013.01); *A63C 9/24* (2013.01); *A63C 10/06* (2013.01);
(Continued)

(58) Field of Classification Search
CPC . A44C 17/0258; A44C 17/0266; A43C 11/00; A43C 11/165; A43C 11/008;
(Continued)

(56) References Cited

U.S. PATENT DOCUMENTS 8,769,844 B2 7/2014 Beers et al.
10,092,065 B2 10/2018 Rushbrook et al.
(Continued)

*Primary Examiner* — Robert Sandy
(74) *Attorney, Agent, or Firm* — Woodard Emhardt Henry Reeves & Wagner LLP

(57) ABSTRACT

An apparatus for automatically adjusting tension on retention member to hold multiple objects together. Examples include using retention apparatus to obtain optimal fit and use of a human wearable item such as article of footwear. Sensors may be used to sense changes in movement of the article of footwear, of the person wearing it, or of a third object such as a vehicle carrying the person. A retention member may surround at least a portion of the objects, and an actuator may be included that automatically rotates a rotating member such as a gear or pulley that may be coupled to the retention member. The rotating member may be configured to automatically adjust tension on the retention member many times per second based on control signals from control logic responsive to the sensors.

19 Claims, 8 Drawing Sheets

Related U.S. Application Data continuation of application No. 15/964,491, filed on Apr. 27, 2018, now Pat. No. 10,849,388.

(60) Provisional application No. 62/490,661, filed on Apr. 27, 2017.

(51) Int. Cl.

| | |
|---|---|
| *G05B 15/02* | (2006.01) |
| *A43B 5/04* | (2006.01) |
| *A43B 11/00* | (2006.01) |
| *B63B 32/30* | (2020.01) |
| *B63B 32/40* | (2020.01) |
| *A45F 3/04* | (2006.01) |
| *A63C 17/26* | (2006.01) |
| *A63C 10/28* | (2012.01) |
| *A63C 10/06* | (2012.01) |
| *A43B 3/34* | (2022.01) |

(52) U.S. Cl.
CPC ............ *A63C 10/28* (2013.01); *A63C 17/262* (2013.01); *G05B 15/02* (2013.01); *A43B 3/34* (2022.01); *A43B 5/0401* (2013.01); *A43B 5/0429* (2013.01); *A43B 5/0435* (2013.01); *A43B 5/0474* (2013.01); *A43B 11/00* (2013.01); *A63C 2203/12* (2013.01); *A63C 2203/24* (2013.01); *B63B 32/35* (2020.02); *B63B 32/47* (2020.02)

(58) Field of Classification Search
CPC ......... G05B 15/02; A63C 10/06; A63C 10/28; A63C 17/262; A63C 9/24; A63C 2203/12; A63C 2203/24; A45F 3/047; A43B 3/0005; A43B 5/0429; A43B 5/0474; A43B 11/00; A43B 5/0435; A43B 5/0401; B63B 35/812; Y10T 24/1431; Y10T 24/1429; Y10T 24/1427; Y10T 24/1441; Y10T 24/1443

See application file for complete search history.

(56) References Cited

U.S. PATENT DOCUMENTS

| | | |
|---|---|---|
| 2014/0070042 A1 | 3/2014 | Beers et al. |
| 2014/0082963 A1 | 3/2014 | Beers |
| 2015/0289596 A1* | 10/2015 | Beers ................ A43C 11/00 36/50.1 |
| 2017/0265576 A1 | 9/2017 | Beers et al. |
| 2017/0295889 A1* | 10/2017 | Beers ................ A43C 11/165 |
| 2019/0090589 A1* | 3/2019 | Rushbrook ........... A43C 11/22 |
| 2019/0246745 A1 | 8/2019 | Bock et al. |
| 2019/0246746 A1 | 8/2019 | Bock et al. |
| 2019/0246747 A1 | 8/2019 | Bock et al. |

\* cited by examiner

AUTOMATIC RETENTION APPARATUS

REFERENCE TO RELATED APPLICATION

The present application is a continuation of U.S. patent application Ser. No. 17/074,976 filed Oct. 20, 2020, now U.S. Pat. No. 11,337,492, which is a continuation of U.S. patent application Ser. No. 15/964,491 filed Apr. 27, 2018, now U.S. Pat. No. 10,849,388, which claims the benefit of U.S. Provisional Patent Application No. 62/490,661, filed Apr. 27, 2017, both of which are hereby incorporated by reference.

BACKGROUND

Wearable devices such as snowboard and ski boots, orthotics, prosthetics, exoskeletons, backpacks and the like can present a constant challenge to the user. Depending on the situation, it may be advantageous for the device to be held more tightly to a person's body, such as when completing a high-speed turn on snow skis or when free-falling just before opening a parachute while sky diving. A loose fit may result in failure to complete the turn, or loss of a parachute when the parachute opens and the user experiences a brief period of rapid deceleration. However, a loose fit is often advantageous during long periods of milder activity, such as while riding up a chair lift on the ski slope, or during the airplane ride to altitude before preparing to sky dive.

The optimum tension applied to the attachment interface of the wearable device may be directly related to movement of the wearable device relative to the person wearing it, or relative to the environment around the person wearing it, or relative to some other context such as a vehicle the person is riding in. This relative motion may be desirable in some situations, and less desirable in others depending on the circumstances. In many situations, the optimum tension may change quickly making it impractical for the user to adjust the tension on the wearable device manually. It may also be the case that the activity the user is engaged in requires using both hands for balance, for manipulating an object, or for support such as in the case of a person using crutches.

SUMMARY

Disclosed are various examples of an automatic retention apparatus for automatically retaining a first object adjacent to a second object. In one example, a retention member may be coupled to the first object and surrounds at least a portion of the second object, and the retention number may be mounted outside of the first object. An actuator may be included that has a rotating member rotatable about an axis of rotation, the rotating member may be outside the first object and coupled to the retention member, the actuator rotates the rotating member in a first direction to increase a length of the retention member reducing tension on the retention member, and the actuator rotates the rotating member in a second direction opposite the first direction to decrease the length of the retention member increasing tension on the retention member. A processor may be included that may be responsive to input from at least one sensor and configured to control the actuator according to the input from the sensor, wherein the processor may be configured to control the actuator to rotate the rotating member in the first or second direction to adjust tension on the retention member to automatically retain the first object adjacent to the second object based on input from the sensor.

In another aspect, the first object may be an article of footwear, and the second object may be a foot of a user inside the article of footwear. In another aspect, the first object may be a container, and the second object may be a person or animal wearing the container. In another aspect, the first object may be a coupling device and the second object may be an article of footwear. In another aspect, the retention member and the first object are separately mounted to a third object, wherein the third object may be optionally any one of a surf board, kite board, ski, snow board, or skate board.

In another aspect, the retention member defines one or more holes passing through at least a portion of the retention member, and the rotating member may be a gear with multiple teeth engaging the holes of the retention member.

In another aspect, first object may be a human wearable device and the second object may be a portion of a human or animal wearing the human wearable device, and the at least one sensor may be configured to sense changes in a sense parameter based on movement of the human wearable device caused by movement of the human or animal wearing the human wearable device. In another aspect, the first object may be a human wearable device and the second object may be a portion of a human or animal wearing the human wearable device, and the at least one sensor may be configured to detect changes in a sense parameter caused by movement of a third object. In another aspect the third object may be coupled to the human wearable device.

In another aspect, the retention member may be arranged along a long axis that may be substantially parallel to the axis of rotation of the rotating member. In another aspect, the retention member may be arranged along a long axis that may be substantially perpendicular to the axis of rotation of the rotating member.

In another aspect, the automatic retention apparatus includes a braking mechanism coupled to the rotating member that may be configured to hold the rotating member from rotating in either the first or second direction.

In another aspect, the sense parameter includes any combination of speed, angular momentum, velocity, motion, acceleration, air pressure, force, ambient air temperature. In another aspect, the at least one sensor includes a first sensor mounted to the retention member and configured generate input based on tension in the retention member, and a second sensor mounted to the first object and configured to generate input based on movement of the first object. In another aspect, the rotating member may be a pulley and the retention member may be a cable wrapped around at least a portion of the pulley. In another aspect, the at least one sensor may be mounted to the first object and configured to generate input based on movement of the first object. In another aspect, the cable passes through a conduit defined by the first object and surrounds the second object retained at least partially inside the first object.

In another aspect, the automatic retention apparatus includes a memory configured to store data about changes in the rotation of the rotating member over a predetermined period of time. In another aspect, the rotation in the first and second directions may be a function of force applied to the retention member by the second object.

In another example, an automatic retention apparatus for an article of footwear may be disclosed that has a sensor configured to sense changes in a sense parameter based on movement of the article of footwear. Also included may be a retention member surrounding at least a portion of the article of footwear, the retention member may be positioned adjacent to an outside surface of the article of footwear, and the retention member defines one or more holes passing through at least a portion of the retention member. The apparatus has an actuator that includes a gear with multiple teeth, the gear rotatable about an axis of rotation and positioned in the actuator so that at least one of the multiple teeth extend into the one or more holes of the retention member, the actuator may be coupled to the retention member adjacent an outside surface of the article of footwear, and the gear may be configured to adjust tension on the retention member as it rotates. Also included may be a processor responsive to input from the sensor and configured to control the actuator according to the input from the sensor, and the processor may be configured to control the actuator to rotate the gear about the axis of rotation to adjust tension on the at least a portion of the article of footwear according to input from the sensor.

In another aspect, the retention member and the article of footwear are separately mounted to a coupling device. In another aspect, the coupling device may be mounted to a snow ski, or snow board. In another aspect, the retention member may be arranged along a long axis that may be substantially parallel to the axis of rotation of the gear. In another aspect, the retention member may be arranged along a long axis that may be substantially perpendicular to the axis of rotation of the gear.

In another aspect, the retention apparatus also includes a braking mechanism coupled to the gear and configured to hold the gear from rotating. In another aspect, the opposing ends of the retention member are mounted adjacent a sole region of the article of footwear, and the actuator may be mounted to the retention member adjacent a toe region of the article of footwear on a side of the article of footwear opposite the sole portion. In another aspect, the retention apparatus also includes a memory storing configuration data of the actuator and historical data of past sensor output and changes to the tension on the retention member, and the processor may be configured to determine a tension to apply to the retention member based on input from the sensor and the configuration data in the memory. Also included may be a wireless communication module controlled by the processor and configured to wirelessly communicate with a remote computer to receive configuration data and send the historical data.

In another aspect, the automatic retention apparatus includes a second retention member surrounding at least a portion of an ankle region of an article of footwear, the second retention member may be positioned adjacent to the outside surface of the article of footwear, and the second retention member defines one or more holes passing through at least a portion of the second retention member. Also included may be a second actuator that includes a second gear with multiple teeth, the second gear rotatable about a second axis of rotation and positioned in the actuator so that at least one of the multiple teeth of the second gear extend into the one or more holes of the second retention member, wherein the second actuator may be coupled to the second retention member adjacent an outside surface of the ankle region of the article of footwear, and wherein the gear may be configured to adjust tension on the second retention member as it rotates. In another aspect the processor may be configured to control the second actuator to rotate the second gear about the second axis of rotation to adjust tension on the ankle region of the article of footwear according to input from the sensor.

Further forms, objects, features, aspects, benefits, advantages, and examples of the present disclosure will become apparent from a detailed description and drawings provided herewith.

DETAILED DESCRIPTION

Figure 1:
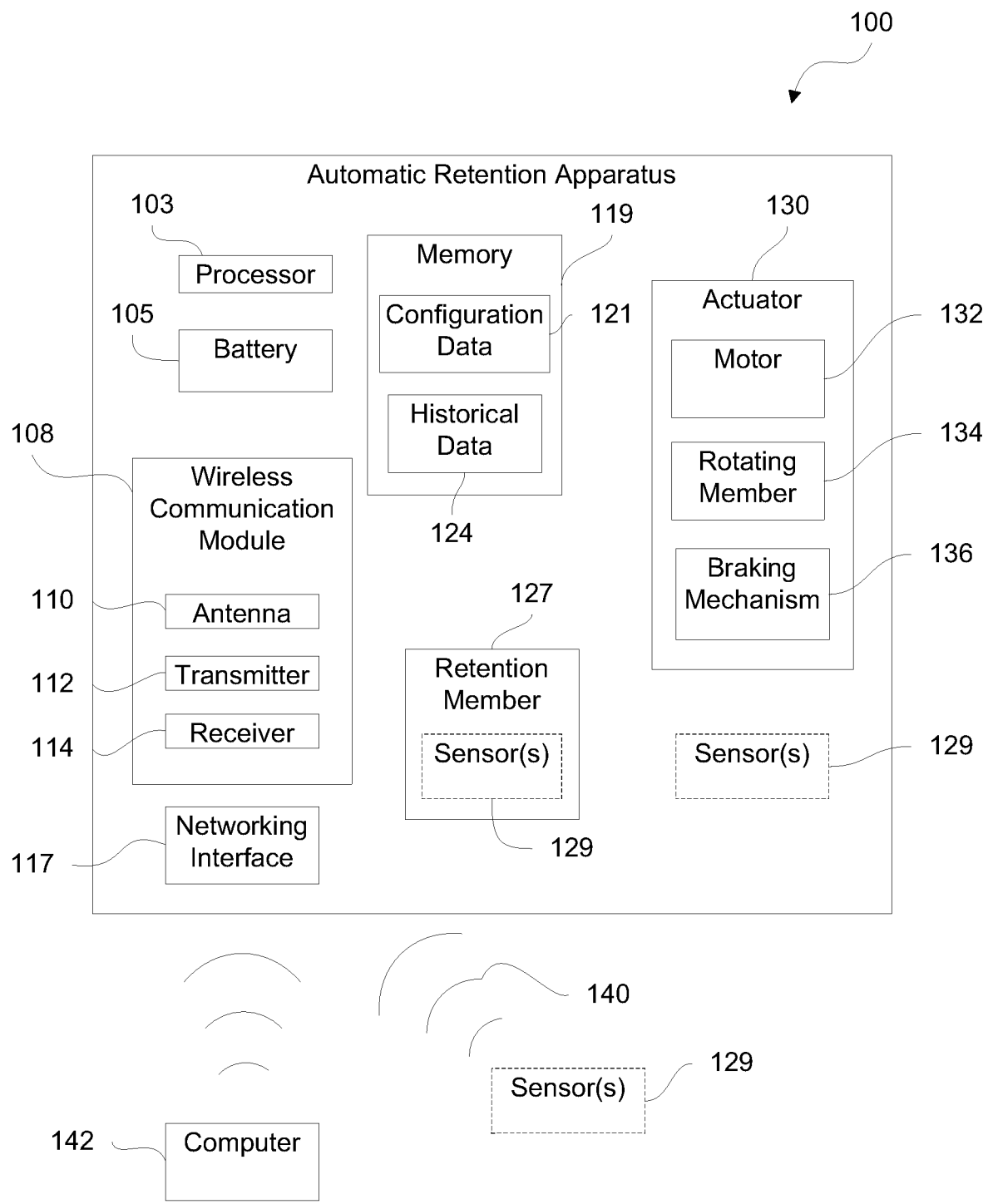
FIG. 1 is a component diagram illustrating exemplary components of an automatic retention apparatus.

FIG. 1 illustrates at 100 components that may be included in automatic retention apparatus. An automatic retention apparatus 100 may include a processor 103 for processing data and generating commands or instructions to other components in the apparatus to control the apparatus. Processor 103 may also be thought of as a controller in that it accepts input and generates output controlling operational characteristics of the apparatus. A battery 105 may be included for providing power to the processor and other components of the apparatus. A memory 119 may be included for storing information such as configuration data 121 and historical data 124. In another aspect, memory 119 may be configured to store data such as time, direction, and extent of the rotation of the rotating member over a predetermined period of time. Memory 119 may also be configured to store data values representing sense parameters detected by sensors 129 provided by the sensors as input to the processor. Historical data 124 may include dates, times, locations, or other metadata. Configuration data 121 may include values for configuring the operation of the automatic retention apparatus.

A wireless communication module 108 may be included and may also have an antenna 110, transmitter 112, and receiver 114. The antenna may be used by the transmitter and receiver to send and receive wireless communications to a remote computer 142 to, for example, send and receive updated configuration data, historical data, and/or control signals. Antenna 110 may be configured to resonate according to radio waves carrying signals defining data sent and received by wireless communication module 108. Transmitter 112 may use antenna 110 to send signals, and receiver 114 may also use antenna 110 to receive signals defining data to be processed by processor 103 and/or stored in memory 119. Signals sent and received by the transmitter and receiver may be sent via any suitable medium such as via radio waves, by modulating visible or invisible light, and the like.

A network interface 117 may be included and may implement various communication protocols useful for interacting with remote devices over a communications link that may be connected to a network such as the Internet. Such a communications link may be a wireless communications link implemented using wireless communication module 108, or a physical communication link implemented using wires, optical fibers, and the like. For example, wireless communication module 108 may transmit and receive signals which may then be processed according to the protocols recognized by network interface 117 in order to implement a communications link.

Retention apparatus 100 may include a retention member 127 for retaining objects together. One or more sensors 129 may be included in or coupled to retention number 127. The sensors may be configured to sense any suitable sense parameter such as any combination of speed, angular momentum, velocity, motion, acceleration, air pressure, force, ambient air temperature, and the like. Sensors 129 may optionally be included in or mounted to retention member 127, or included in or mounted to automatic retention apparatus 100. Sensor input from sensors on other objects interacting with apparatus 100 may also be used such as in the case of wireless sensors sending data received as signals 140 by wireless communication module 108 from a remote location.

An actuator 130 may be included and configured to act on retention number 127 to increase or decrease tension on the retention member to vary the resulting tension on any or objects to be held in place by a retention member 127. A motor 132 may be included in actuator 130 and coupled to a rotating member 134 such as the gear, pulley, and the like. An optional braking mechanism 136 may be coupled to rotating member 134 two selectively limit movement of rotating member 134, such as, for example reducing or eliminating the possibility of retrograde rotation after rotating member 134 is no longer being acted on by motor 132. In this way, braking mechanism 136 may be used to maintain tension on retention member 127 after actuator 130 has applied tension.

Figure 2:
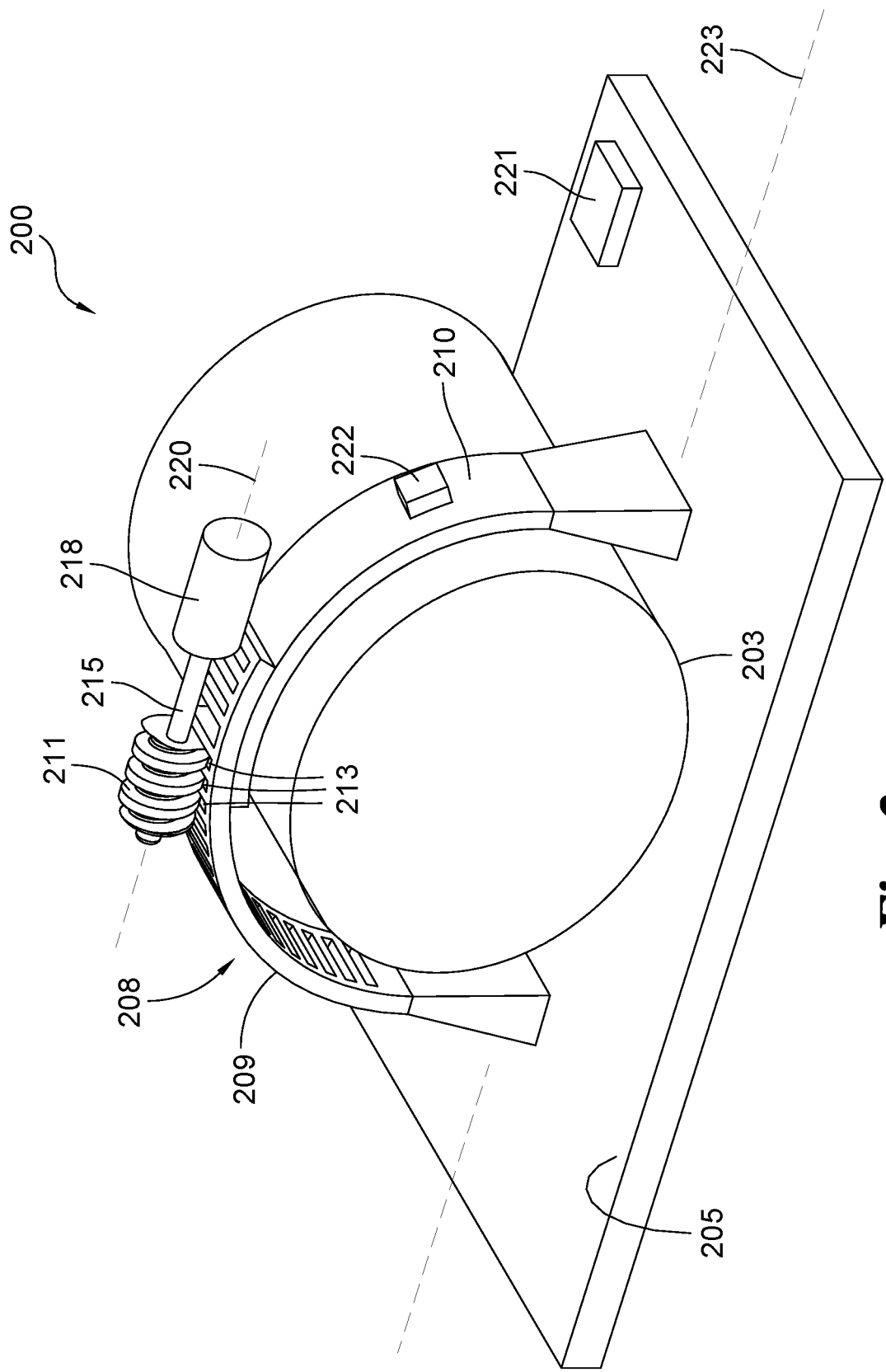
FIG. 2 illustrates one example of how some of the components illustrated in FIG. 1 may be arranged.

FIG. 2 illustrates at 200 one example of an arrangement of some of the parts of the automatic retention apparatus discussed in FIG. 1. A retention member 208 is coupled to a first object 205 and surrounds at least a portion of a second object 203 such that the retention member is mounted outside the first object 205. In this example, retention member 208 includes multiple portions such as a left portion 209 and a right portion 210 which may be mounted to first object 205.

Aspects of an actuator like actuator 130 are illustrated in FIG. 2. The actuator includes a rotating member 211 rotatable about an axis of rotation 220. Rotation about the axis is provided by a motor 218 coupled to rotating member 211 by a shaft 215. In this example, rotating member 211 is a worm gear with one or more teeth engaging one or more holes 213 passing through at least a portion of the retention member 208. Rotating member 211 rotates around and axis of rotation 220 that is substantially parallel to the longitudinal axis 223 of retention member 208. As illustrated, the rotating member is outside the first object and coupled to retention number 208 such that when the actuator rotates the rotating member in a first direction, the length of retention member 208 is increased thus reducing tension on the retention member and consequently reducing the tension of retention member 208 on second object 203. In other words, reducing tension on the retention member reduces the compression force on object 203 caused by retention member 208 thus relaxing the compression of object 203 with respect to object 205. When the actuator rotates rotating member 211 in a second direction opposite the first direction, the length of retention member 208 is decreased thus increasing tension on the retention member 208 and increasing tension on second object 203. Reducing the length of retention number 208 thus increases the compression force caused by retention member 208 on object 203 thus also pressing object 203 and 205 together more tightly. In this way, an actuator with a motor driving a worm gear that engages holes in a retention member is operable to automatically adjust a force applied to a first object to retain it in proper relationship with a second object by adjusting tension on the retention member.

In another aspect, a processor such as processor 103 responsive to input from at least one sensor like sensor 129 may be configured to control the actuator. A processor may control the actuator instructing it to energize the motor to rotate the rotating member in the first or second direction to adjust the tension on the retention member to automatically retain the first object adjacent to the second object based on input from the sensor. For example, processor 103 may control the actuator to rotate in the first and second directions with the direction and number of rotations being a function of force applied to the retention member by the second object as measured by sensors 129.

In another aspect, FIG. 2 illustrates an example of sensors 129 positioned to collect data about sense parameters related to the operation of the automatic retention apparatus. For example, a sensor 222 is mounted to retention member 208, and a sensor 221 is mounted to first object 205. Sensor 222 is configured to generate input for the processor based on tension in the retention member 208, and sensor 222 is configured to generate input for the processor based on movement of the first object 205. This allows the processor to determine and control tension in retention member 208 according to movement of the first object.

In another aspect, the processor controls rotation in the first and second directions as a function of force applied to the retention member by the second object. This force may be measured using any of sensors 129 such as by measuring changes in the tension on retention member 208 measured by sensor 222. For example, if first object 205 is accelerated in a direction away from retention member 208, the tension on retention member 208 applied by second object 203 will increase and may be measured as a temporary or prolonged increase in force applied to the retention member by the second object 203 as measured by sensor 222. The apparatus may then respond to the sensor readings by automatically rotating rotatable number 211 two shorten retention member 208 the supplying additional force to objects 205 and 203 to retain them in place.

Figure 3:
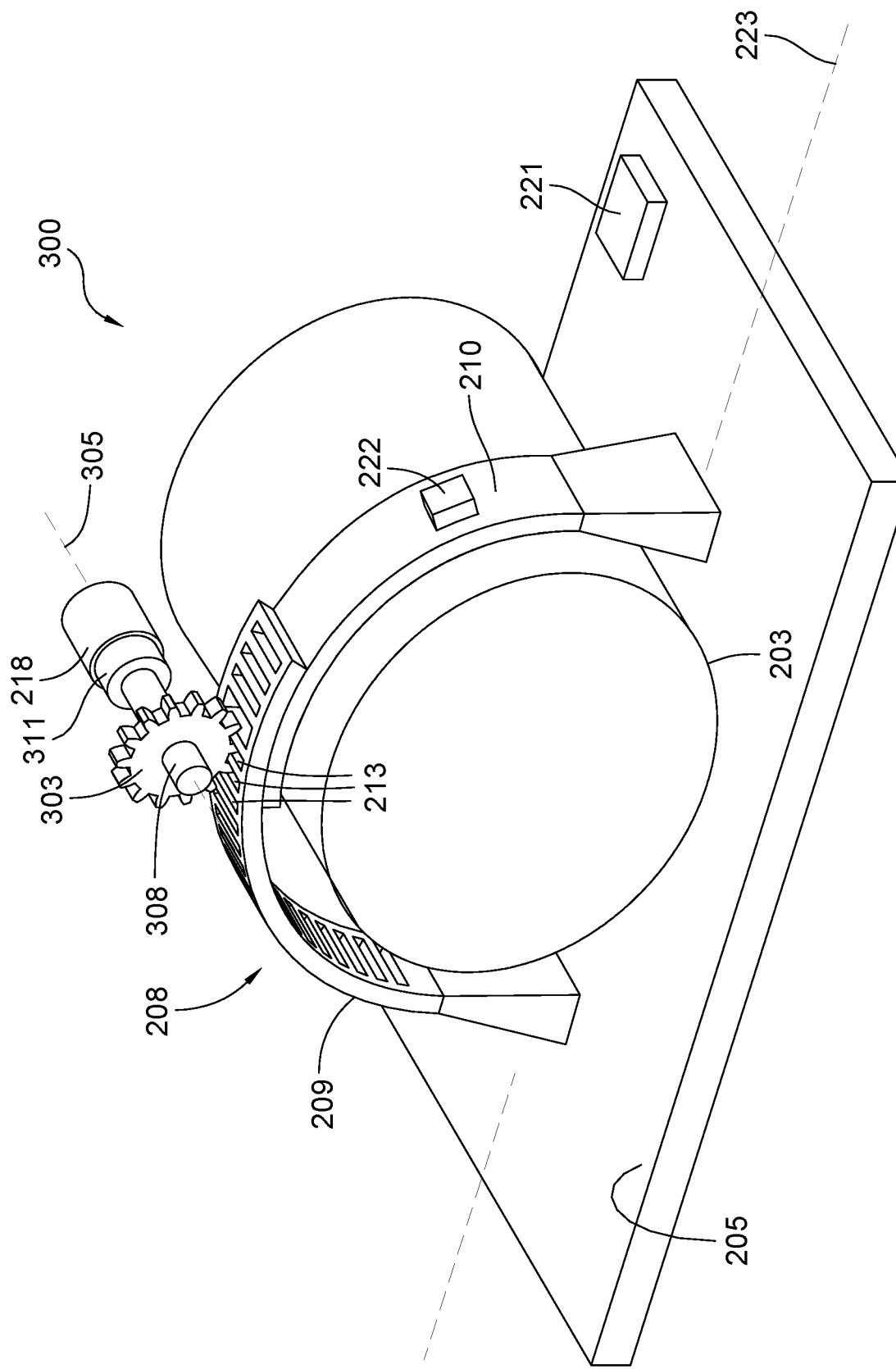
FIG. 3 illustrates another example of how some of the components illustrated in FIG. 1 may be arranged.

Another example of an arrangement of some of the parts of automatic retention apparatus 100 is shown at 300 in FIG. 3. In this example, motor 218 rotates a shaft 308 that rotates around an axis of rotation 305. Unlike the example of 200, the retention member is arranged along a longitudinal axis 223 that is substantially perpendicular to the axis of rotation 305 of the rotating member 208. In this example a rotating member 303 is a gear that rotates with shaft 308 to engage retention member 208. Teeth of gear 303 engage holes 213 to cause left portion 209 to move in the direction of right portion 210 thus increasing tension in the retention member and applying a corresponding compression force to retain second object 203 in the proper position with respect to first object 205.

A braking mechanism 311 is coupled to the rotating member and configured to hold the rotating member from rotating in either the first or second direction, such as when motor 218 has stopped rotating shaft 308. In another aspect, the processor may be configured to selectively engage and/or disengage braking mechanism 311 to facilitate changes in the tension of retention member 208 while maintaining those changes. In another aspect, braking mechanism 311 may be configured to automatically release when motor 218 begins to rotate and then automatically activate when stops rotating shaft 308. Braking mechanism 311 may thus reduce or eliminate unwanted forward or reverse rotation that might, for example, cause retention member 208 to loosen after motor 218 has stopped rotating. Like the example shown in FIG. 2, the processor may accept input from sensors 129, such as sensors 222 and 221, to adjust the tension according to forces applied to the retention member 208, first object 205, and second object 203.

Figure 4:
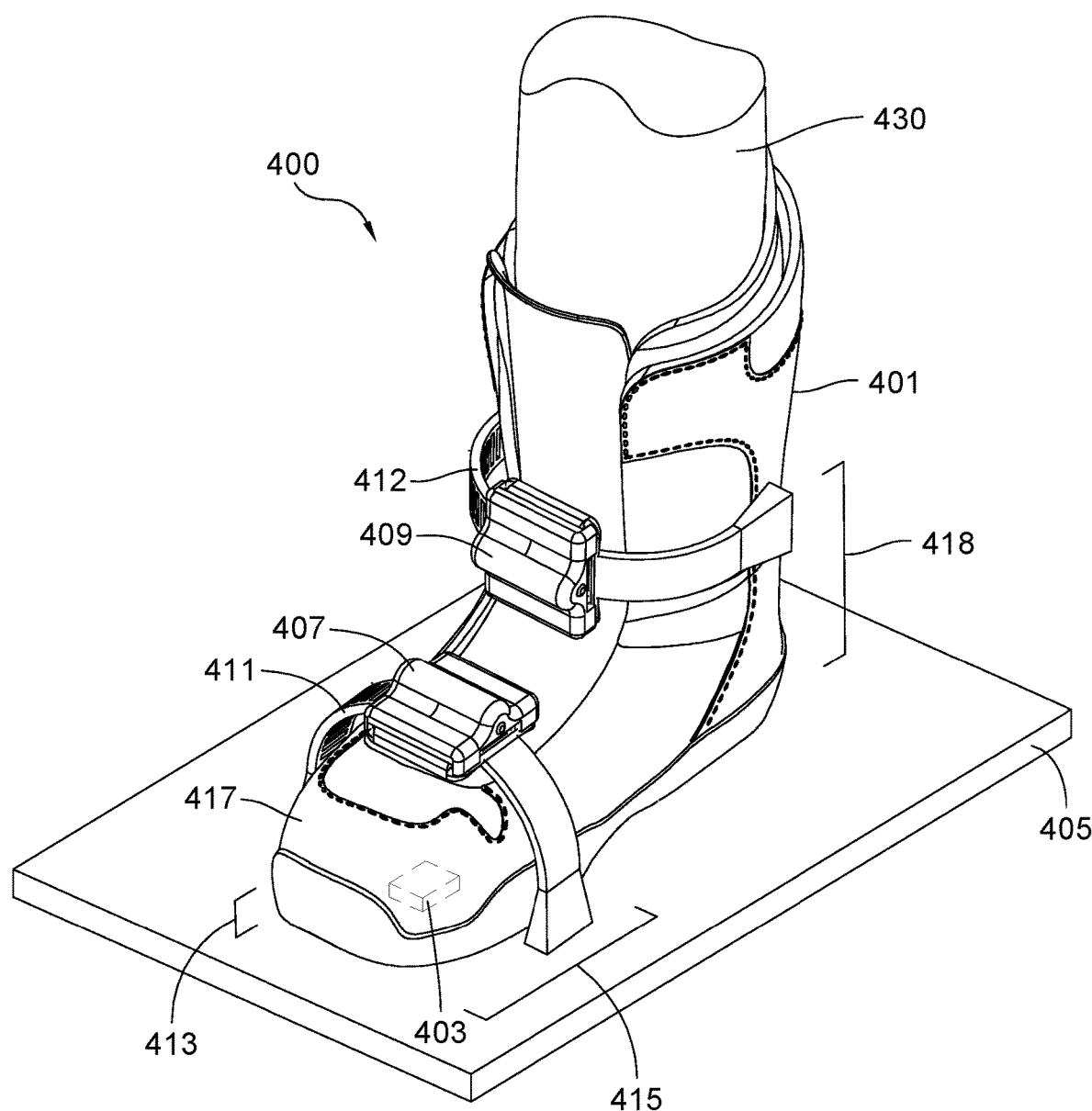
FIG. 4 illustrates one example of an automatic retention apparatus of FIG. 1 used in conjunction with an article of footwear.

FIG. 4 illustrates at 400 aspects of the disclosed automatic retention apparatus adapted for use with a human wearable object such as an article of footwear. In this example, the article of footwear 401 may be mounted to an object 405 which may be any object such as a snow ski, snowboard, sail board, kite board, surfboard, and the like. A first automatic retention apparatus 407 is coupled to the object 405 with opposing ends of a retention member 411 mounted adjacent to a sole region 413 of the article of footwear 401.

An actuator like those discussed above in FIGS. 1-3 may be included in retention apparatus 407 that includes a gear with multiple teeth, the gear rotatable about an axis of rotation and positioned in the actuator so that at least one of the multiple teeth extends into the one or more holes of the retention member. The actuator is coupled to the retention member adjacent an outside surface 417 of the article of footwear, and the gear is configured to adjust tension on the retention member as it rotates as discussed previously (See FIGS. 2 and 3). In FIG. 4, the actuator is mounted to the retention member 411 adjacent a toe region 415 of the article of footwear 401 on a side opposite the sole portion 413. A sensor 403 may be included and is configured to sense changes in a sense parameter based on movement of the article of footwear. As disclosed elsewhere, such changes may include, but are not limited to, any combination of speed, angular momentum, velocity, motion, acceleration, force, and the like. Sensor 403 may be included in the article of footwear 401, such as embedded in the sole portion 413, or optionally mounted in any other suitable location including inside retention apparatus 407.

In another aspect, retention apparatus 407 may include a processor responsive to input from the sensor 403, and may be configured to control the actuator according to the input from the sensor. The processor may be configured to control the actuator to rotate the gear about the axis of rotation to adjust tension on the portion of the article of footwear according to input from the sensor in a manner similar to what is illustrated in FIGS. 2 and 3 and disclosed herein.

In another aspect, FIG. 4 illustrates that automatic retention apparatus 407 may be configured such that the actuator, gear, processor, and at least a portion of the retention member 411 are contained within a housing separate from and adjacent to the article of footwear. In another aspect discussed herein elsewhere, retention apparatus 407 may include a memory storing configuration data of the actuator and historical data of past sensor output and changes to the tension on the retention member. The processor may be configured to determine a tension to apply to the retention member based on input from the sensor and the configuration data in the memory. Retention apparatus 407 may also include a wireless communication module controlled by the processor and configured to wirelessly communicate with a remote computer or remote sensors such as sensor 403 to receive configuration data, send historical data, or receive sensor input in the form of sensor data defined by electromagnetic signals.

Also illustrated in FIG. 4 is a second automatic retention apparatus 409 that is like automatic retention apparatus 407 and may include a second retention member 412 surrounding at least a portion of an ankle region 418 of the article of footwear 401. In this example, second retention member 412 is positioned adjacent to the outside surface 417 of the article of footwear, the second retention member 412 defines one or more holes passing through at least a portion of the second retention member. Second retention apparatus 409 may be configured like first retention apparatus 407 to further include a second actuator with a second gear having multiple teeth, the second gear rotatable about a second axis of rotation and positioned in the actuator so that at least one of the multiple teeth of the second gear extend into the one or more holes of the second retention member. The second actuator may be coupled to the second retention member 412 adjacent an outside surface 417 of the ankle region 418 of the article of footwear, and the second gear may be configured to adjust tension on the second retention member as it rotates as discussed herein elsewhere. Like in the case of a processor in the first automatic retention apparatus 407, the processor in apparatus 409 may be configured to control the second actuator to rotate the second gear about the second axis of rotation to adjust tension on the ankle region 418 of the article of footwear 401 according to input from the sensor 403.

The article of footwear 401 may be thought of as a first object, and a foot 430 of a user or person wearing the article of footwear may be thought of as the second object, and a retention member such as a member 411, or 412 may be separately mounted to a third object 405 that is separate from the first and second objects. This third object may be a human wearable object such as recreational items surf boards, kite boards, skis, snow boards, or skate boards. The third object may be any human wearable object such as a medical brace, exoskeleton, and the like.

In another example, the first object may be a human wearable device such as the article of footwear 401, and the second object may be a portion of a human or animal 430 that is wearing the human wearable device. At least one sensor such as sensor 403 may be configured to sense changes in a sense parameter based on movement of the human wearable device caused by movement of the human or animal wearing the human wearable device. In another aspect, the first object may be a human wearable device such as the article of footwear 401, and the second object may be a portion of a human or animal wearing the human wearable device. At least one sensor may be configured to detect changes in a sense parameter caused by movement of the third object 405. As illustrated in FIG. 4, the third object may be coupled to the human wearable device such as in the case of footwear 401 which may be coupled to object 405.

Figure 5:
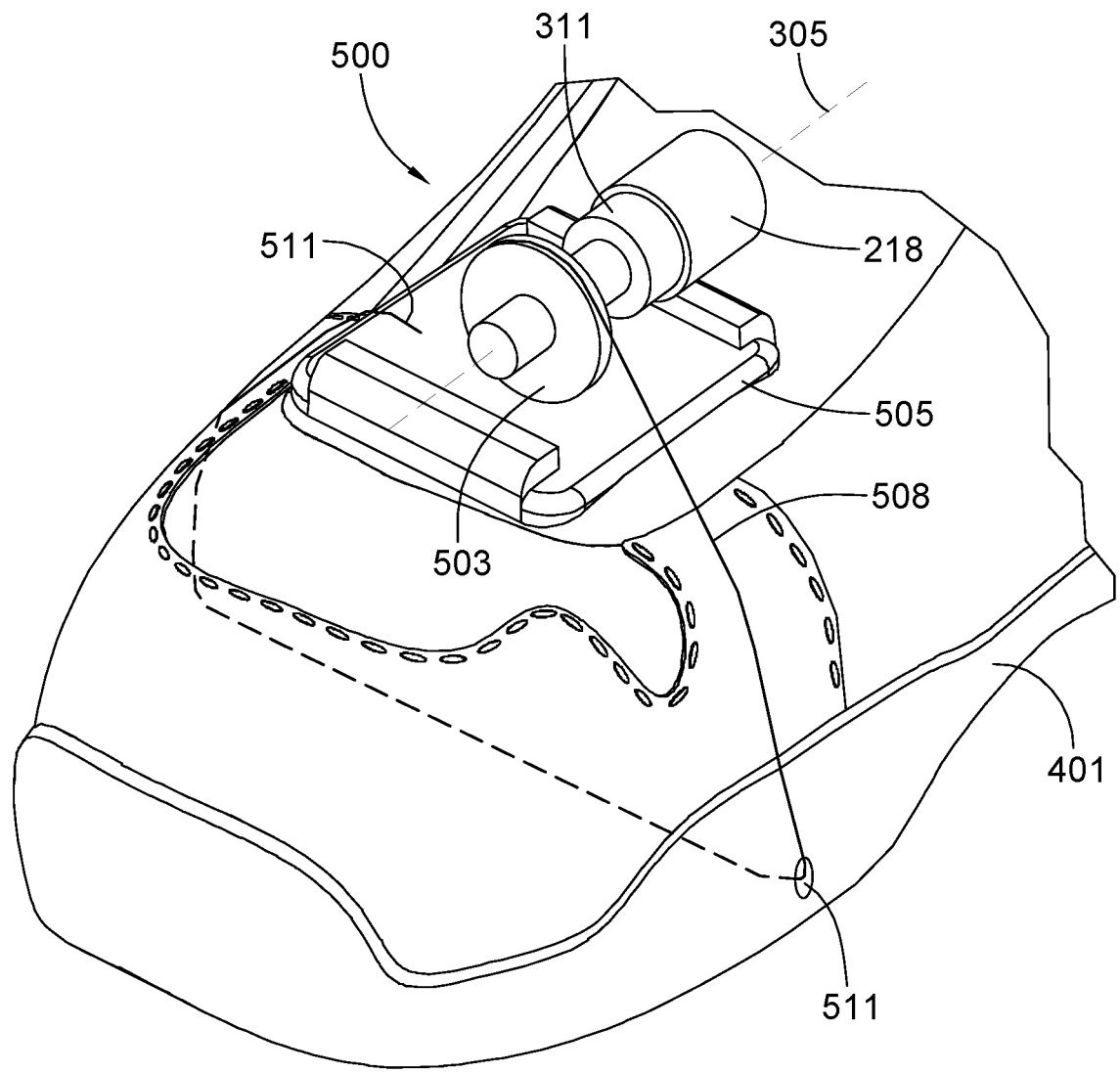
FIG. 5 illustrates another example of an automatic retention apparatus of FIG. 1 used in conjunction with the article of footwear in FIG. 4.

FIG. 5 illustrates at 500 another example of an automatic retention apparatus like the examples shown in preceding figures. In FIG. 5, motor 218 drives a pulley 503 that is coupled to a retention member 508 which is wrapped around at least a portion of the pulley. In this example, retention member 508 is a cable coupled to pulley 503 and passing around a portion of a first object such as an article of footwear 401. The cable passes through a conduit 511 defined by the first object and surrounds the second object such as a portion of person or animal (e.g. a foot) that is retained at least partially inside the first object. Motor 218 and retention member 508 may be anchored to a base 505, which may also be mounted to the article of footwear 401, or may be separately mounted to a third object as discussed herein elsewhere.

Figure 6:
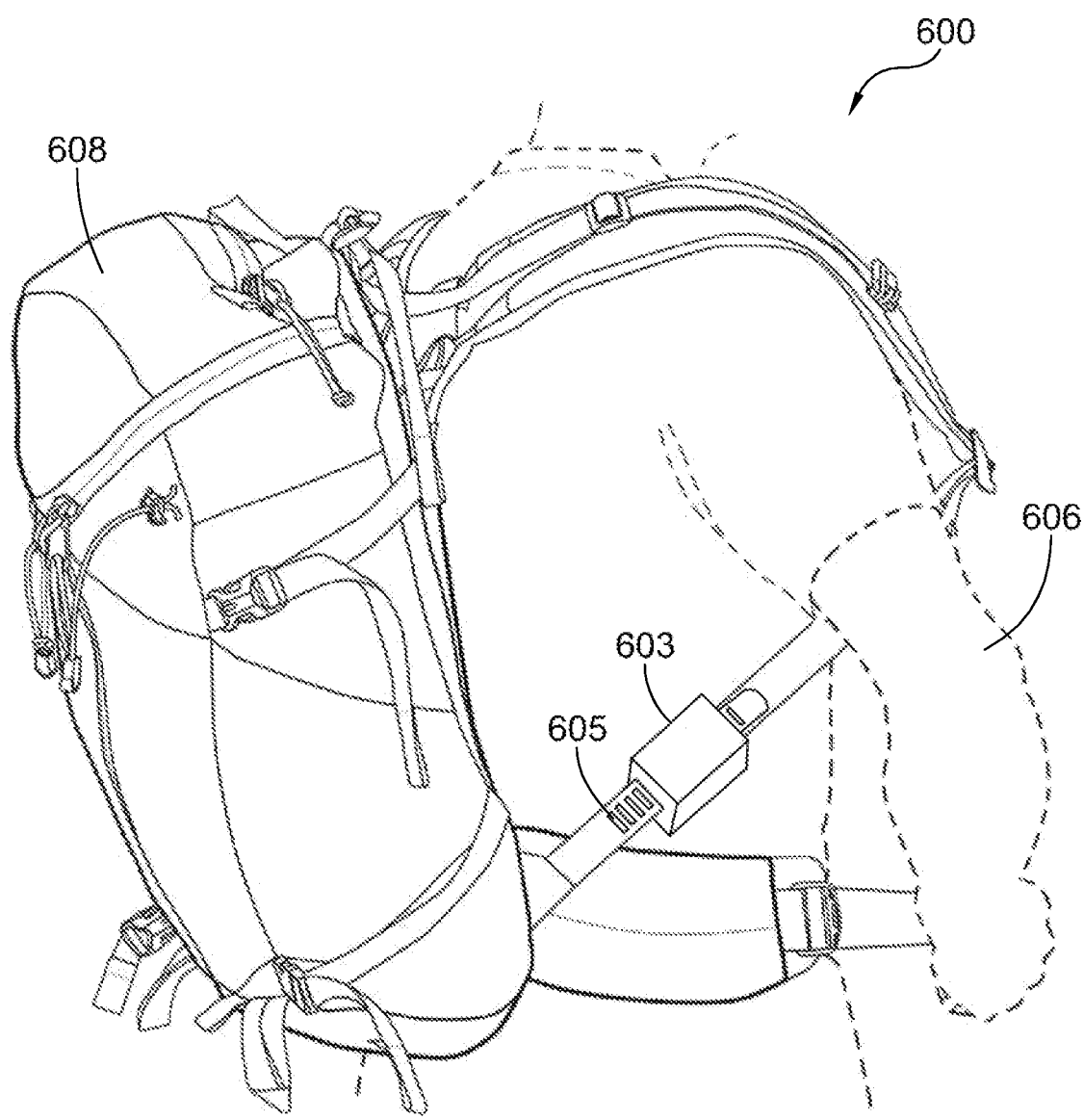
FIG. 6 illustrates another example of an automatic retention apparatus of FIG. 1 used in conjunction with the human wearable object.

FIG. 6 illustrates at 600 aspects of the disclosed automatic retention apparatus adapted for use with the other human wearable devices such as a backpack 608, or other similar container configured to be worn or carried by a person or animal 606. In this example automatic retention apparatus 603 is configured to adjust tension on a retention member 605. In referring to the previous figures discussed herein, backpack 608 may be thought of as a first object that is a container, and the person or animal 606 carrying the backpack 608 be thought of as the second object. Movement of a third object, such as a vehicle carrying the person or animal 606, may be sensed by a sensor in retention apparatus 603, or by sensors in the environment, or included with the third object and sent to the retention apparatus by electromagnetic signals. In operation, retention member 605 may be kept relatively loose while sensors 129 detect relative low levels of acceleration, speed, and the like (e.g. while the user 606 is walking) so that the backpack 608 is comfortable. As the person begins to move faster, runs, jumps, or perhaps falls or begins to slide or tumble downhill, the sensor input may be used by the processor in the apparatus to increase the tension on the retention member according to the principles illustrated herein so as to automatically maintain the backpack 608 with the person 606 so avoid separation.

In another example, the backpack 608 may include a parachute, such as in the case of sky diver. While walking to the aircraft, or even while flying to the jump altitude, the retention member 605 may be kept relatively loose by the retention apparatus, and may automatically tighten somewhat when sensors 129 detect reduced air pressure as the plane climbs, and may tighten further when a dramatic increase in acceleration is detected, such as when the person jumps from the aircraft.

In operation, the processor and/or other electronics in the various examples of an automatic retention apparatus disclosed herein is operable to automatically adjust the tension on the retention member. In one operational aspect, the processor is programmed to perform a power on process for the data collection and control electronics. The process may begin by receiving a power on command to activate the apparatus including the processor and any additional control electronics. The processor may initiate communication with an inertial sensor suite via a digital interface, and may also initialize a file system in the memory for recording data and maintaining configuration data such as the configuration data discussed herein. The processor may also begin calibration of all available sensors such as any inertial sensors. This may include configuring the resolution of the sensors and the sample rate. It may also include configuring sensor noise filter.

The processor may also be configured to execute a data collection and control algorithm. The algorithm may include retrieving the available stream of data from any available sensors representing the values of the various sense parameters generated by the sensors. The processor may apply/update digital filter of state data, and/or use an adaptive algorithm to identify important data features in the time and frequency domain of the incoming data stream. The processor may use the resulting data, configuration parameters, and real-time data features to calculate one or more values representing the tension to be applied to the retention member. The processor may compare the values to measured device parameters and communicate the tension values to the actuator to adjust the tension accordingly. The data collection and control algorithm may then repeat as necessary. The algorithm may execute multiple times a second such as more than 10 times a second, more than 1000 times a second, or more than a million times a second.

Figure 7:
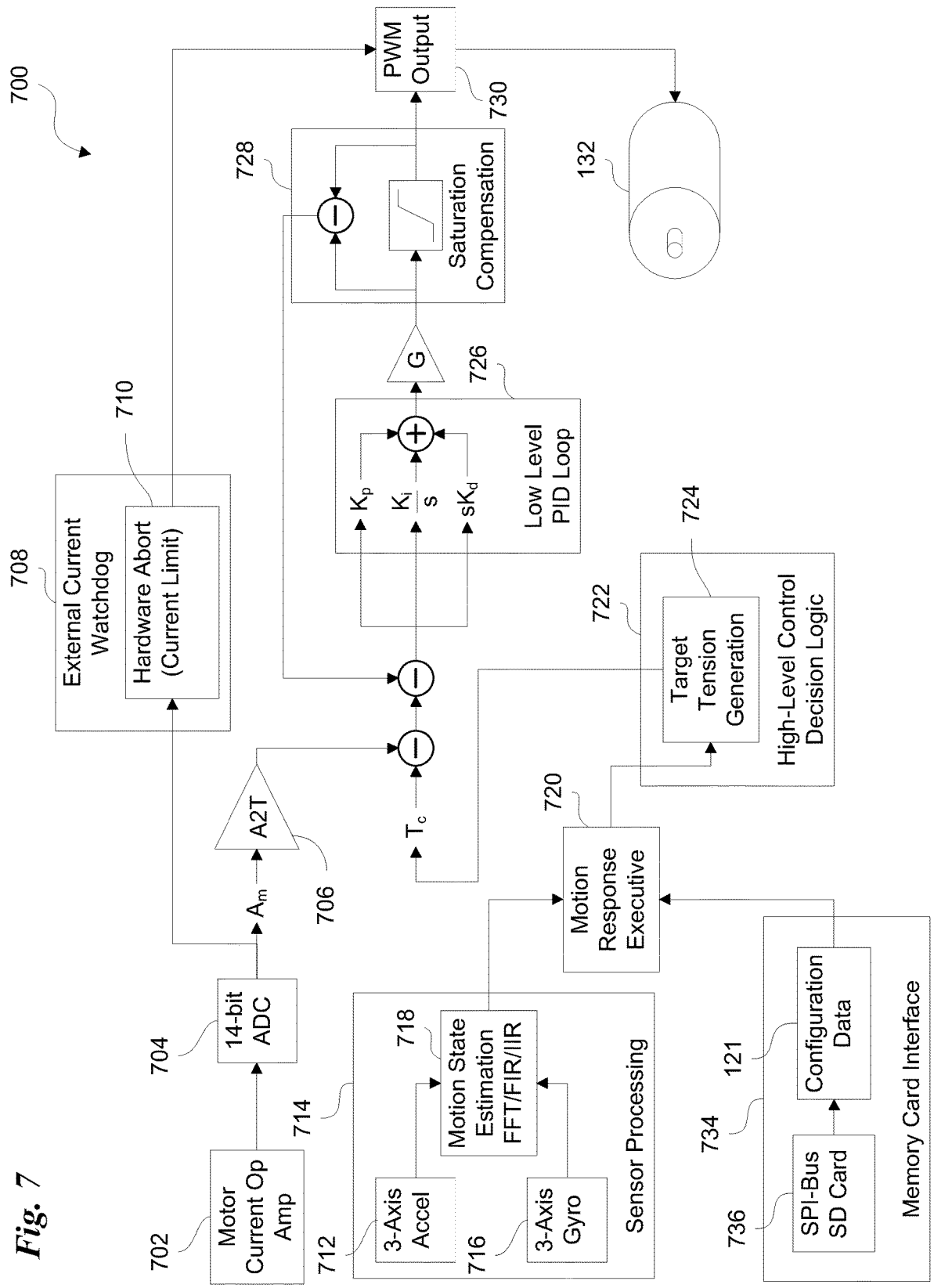
FIG. 7 is a circuit component diagram illustrating one example of a control circuit for the automatic retention apparatus of FIGS. 1-6

One example of circuit components for processing signal input and producing a motor control output is illustrated at 700 in FIG. 7. These components may be used with, or included in components discussed herein elsewhere, particularly with respect to the components illustrated in FIG. 1 at 100. The control circuit at 700 may include multiple sub circuits such as a sensor processing circuit 714, a memory card interface 734, and high-level control of decision logic circuit 722, and external current watchdog circuit 708, a low level Proportional Integral Derivative (PID) loop 726, and the saturation compensation circuit 728. External current watchdog circuit 708 may include a hardware abort aspect which may operate as a current limiter to avoid overloading motor 132. A motor current operational amplifier (or "Op Amp") 702 passes signals representing the data value for motor current to a 14-bit Analog to Digital Converter (ADC) 704. The sensor processing circuit 714 may include any suitable sensors 129 such as a 3-axis accelerometer 712 and 3-axis gyro 716 which may be used to estimate the motion state at 718 by utilizing such filters as the FFT (Fast Fourier Transform), FIR (Finite Impulse Response), and IIR (Infinite Impulse Response). Memory card interface 734 may include an SPI-bus and SD card reader 736 with access to update configuration data 121 which may include user configurable aspects or operating parameters of the automatic retention apparatus. The motion response executive 720 then reads the motion state and configuration data and passes the result to high-level control decision logic 722 which may then determine a target tension using target tension generation circuits 724. This target tension may be compared to the actual tension calculated from motor current or sensor circuitry comparing aspects such as force, torque or position data. The result is passed to PID loop 726 and saturation circuitry 728 producing an output such as Pulse Width Modulation (PWM) output 730 which may be provided to motor 132 to automatically control tension on the retention member as discussed herein elsewhere.

Glossary of Definitions and Alternatives

While examples are illustrated in the drawings and described herein, this disclosure is to be considered as illustrative and not restrictive in character. The present disclosure is exemplary in nature and all changes, equivalents, and modifications that come within the spirit of the inventions as defined in the claims are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items may be illustrated in the drawings with the same part number but differentiated by a letter for separate individual instances. These may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Actuator" generally refers to a device for activating or controlling the actions of an actuated device. This may include, but is not limited to, moving or controlling movement. An actuator may be an element or aspect of the actuated device, such as in the case of a valve that includes an actuator for opening and closing the valve. An actuator may actuate operation of the device by direct mechanical linkage, by signals sent to the device via electromagnetic energy traveling over a wire, optical fiber, or through the air, or by actuating an intervening apparatus that causes the desired actuation of the target device.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff' angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

Figure 8:
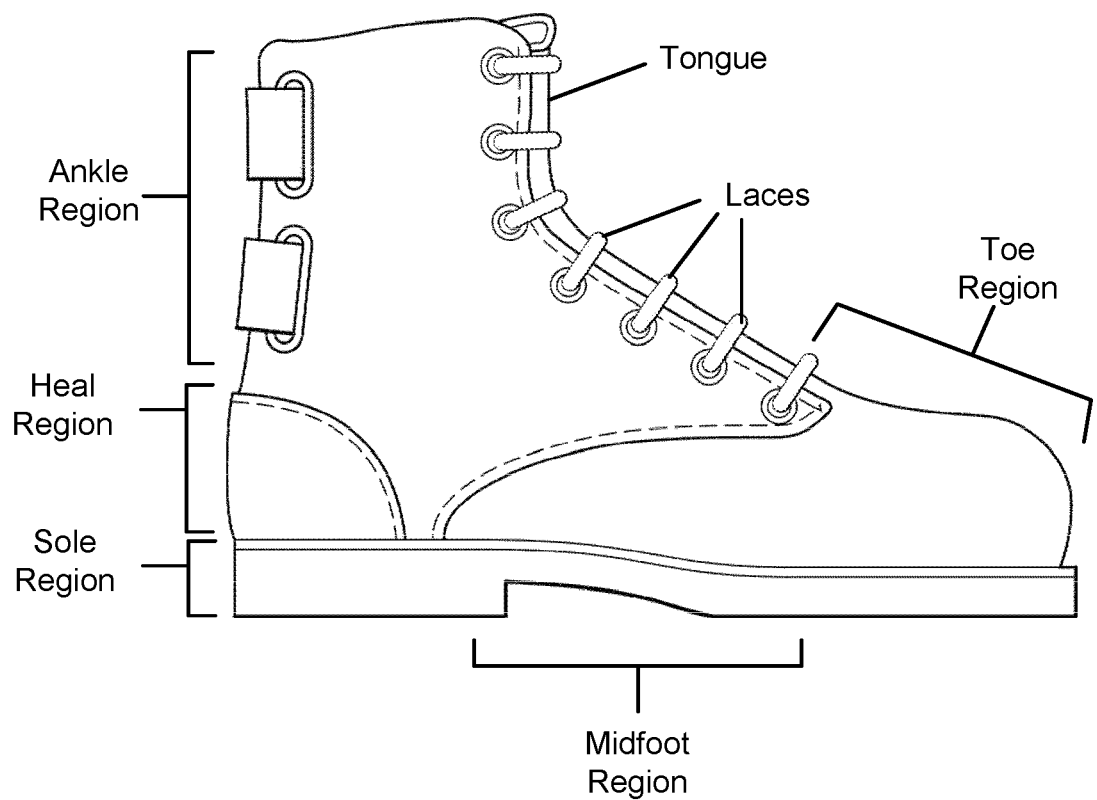
FIG. 8 illustrates an example of the disclosed regions of an article of footwear that may be used with the automatic retention apparatus of FIGS. 1-7.

"Article of Footwear" generally refers to an object configured to be worn on the foot of a human or an animal. Examples of articles of foot wear include, but are not limited to, shoes, boots, sandals, socks, stockings, leg braces, waders, and wet suits. An example of regions of an article of footwear as referenced herein is illustrated in FIG. 8. Note that some articles of footwear do not rise high enough along the leg to cover the ankle, and therefore some footwear does not include an ankle region. Some foot wear does not include laces or a tongue, and may not include a heal region that is enclosed.

"Battery" generally refers to an electrical energy storage device or storage system including multiple energy storage devices. A battery may include one or more separate electrochemical cells, each converting stored chemical energy into electrical energy by a chemical reaction to generate an electromotive force (or "EMF" measured in Volts). An individual battery cell may have a positive terminal (cathode) with a higher electrical potential, and a negative terminal (anode) that is at a lower electrical potential than the cathode. Any suitable electrochemical cell may be used that employ any suitable chemical process, including galvanic cells, electrolytic cells, fuel cells, flow cells and voltaic piles. When a battery is connected to an external circuit, electrolytes are able to move as ions within the battery, allowing the chemical reactions to be completed at the separate terminals thus delivering energy to the external circuit.

A battery may be a "primary" battery that can produce current immediately upon assembly. Examples of this type include alkaline batteries, nickel oxyhydroxide, lithium-copper, lithium-manganese, lithium-iron, lithium-carbon, lithium-thionyl chloride, mercury oxide, magnesium, zinc-air, zinc-chloride, or zinc-carbon batteries. Such batteries are often referred to as "disposable" insofar as they are generally not rechargeable and are discarded or recycled after discharge.

A battery may also be a "secondary" or "rechargeable" battery that can produce little or no current until charged. Examples of this type include lead-acid batteries, valve regulated lead-acid batteries, sealed gel-cell batteries, and various "dry cell" batteries such as nickel-cadmium (NiCd), nickel-zinc (NiZn), nickel metal hydride (NiMH), and lithium-ion (Li-ion) batteries.

"Braking mechanism" generally refers to a selectively engageable mechanism configured to reduce or halt the movement or rotation of one object with respect to another. In one example, a braking mechanism uses friction between two surfaces selectively pressed together to convert the kinetic energy of the moving or rotating object into heat, though other methods of energy conversion may be employed. Regenerative braking converts much of the energy to electrical energy, which may be stored for later use. Other methods convert kinetic energy into potential energy in such stored forms as pressurized air or pressurized oil. Eddy current brakes use magnetic fields to convert kinetic energy into electric current in the brake disc, fin, or rail, which is converted into heat. Still other braking methods even transform kinetic energy into different forms, for example by transferring the energy to a rotating flywheel.

Another example of a braking mechanism is a ratchet which allows continuous linear or rotary motion in only one direction while preventing motion in the opposite direction. A ratchet may include a series of engagement members such as teeth arranged around a gear or on linear rack. A pivoting, spring-loaded finger called a pawl engages the teeth. The teeth are uniform but asymmetrical, with each tooth having a moderate slope on one edge and a much steeper slope on the other edge. When the teeth are moving in the unrestricted (i.e., forward) direction, the pawl easily slides up and over the gently sloped edges of the teeth, with a biasing element such as a spring forcing it into the depression between the teeth as it passes the tip of each tooth. When the teeth attempt to move in the opposite (backward) direction the pawl catches on the steeply sloped edge of the first tooth it encounters, thereby locking it against the tooth and preventing any further motion in that direction until the pawl is released.

"Cable" generally refers to one or more elongate strands of material that has tensile strength but little if any compressive strength. In other words, a cable is a relatively flexible elongate structure of one or more strands that tends to resist being pulled apart or stretched, but is generally unable to resist being compressed together. Examples include wire rope, flexible shafts, Bowden cables, coaxial cable, twisted pair electrical wire, a single strand of wire, as well as non-wire ropes made of natural or synthetic fibers.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Communication Link" generally refers to a connection between two or more communicating entities and may or may not include a communications channel between the communicating entities. The communication between the communicating entities may occur by any suitable means. For example the connection may be implemented as a physical link, an electrical link, an electromagnetic link, a logical link, or any other suitable linkage facilitating communication.

In the case of physical link, communicating entities may be physically connected one to another. For example, the physical link directly connected to one entity may be directly connected to another. In the case of an electrical link, the communication link may be composed of one or more electrical conductors electrically connected to the communicating entities to form the communication link. In the case of an electromagnetic link, the communicating entities may be coupled to a communications link by sending or receiving electromagnetic energy at any suitable frequency, thus allowing communications to pass as electromagnetic waves. These electromagnetic waves may or may not pass through a physical medium such as a wire or an optical fiber, or through free space, or any combination thereof. Electromagnetic waves may be passed at any suitable frequency including any frequency in the electromagnetic spectrum.

In the case of a logical link, the communication link may be a conceptual linkage between the sender and recipient such as a transmission station and receiving station. Logical link may include any combination of physical, electrical, electromagnetic, or other types of communication links.

"Coupling device" generally refers to a device for coupling one object to another. Examples include a belt buckle, a zipper, a latch, a padlock, a trailer hitch, a clothing button, an electrical connector, boot bindings for a snow board or snow ski, and foot straps for a water ski, kite board, surf board, wave board, or sail board, to name a few non-limiting examples.

"Gear" generally refers to a machine part having engagement teeth, or cogs, which extend outwardly away from the body of the gear. The teeth are configured to mesh with another part have corresponding similarly spaced teeth or similarly spaced holes that extend at least a portion of the way through the other part. Types of gears include spur, helical, skew, double helical, bevel, spiral bevel, hypoid, crown, worm, non-circular, rack and pinion, epicyclic, sun and planet, harmonic, cage, cycloidal, and magnetic to name a few non-limiting examples.

Worm gears resemble screws and mesh with a worm wheel, which looks similar to a spur gear. Worm-and-gear sets are a simple and compact way to achieve a high torque, low speed gear ratio. A worm gear is a species of helical gear, but its helix angle is usually somewhat large (close to 90 degrees) and its body is usually fairly long in the axial direction. These attributes give it screw like qualities. The distinction between a worm and a helical gear is that at least one tooth persists for a full rotation around the helix. A worm gear may be thought of as having a single tooth in the case where the tooth persists for several turns around the helix. A worm gear may also be thought of as having more than one tooth when viewed perpendicular to the long axis of the gear. The reappearing tooth at intervals along the length of the worm may thus be thought of as multiple teeth.

In a worm-and-gear set, the worm can always drive the gear. However, if the gear attempts to drive the worm, it may or may not succeed. Particularly if the lead angle is small, the gear's teeth may simply lock against the worm's teeth, because the force component circumferential to the worm is not sufficient to overcome friction. In traditional music boxes, however, the gear drives the worm, which has a large helix angle. A worm and gear set may be "self-locking", as when it is desired to set the position of a mechanism by turning the worm and then have the mechanism hold that position without allowing retrograde rotation. An example is the machine head found on some types of stringed instruments.

"Hole" generally refers to a hollowed out area defined by a solid body or surface. A hole may extend into the solid body or surface without passing through such as in the case of an indention, depression, or pit. A hole may also pass through one side of an object to another side, thus passing completely through the object. The second side may be the same as the first, such as in the case of loop inside a solid body. Holes may have any suitable shape such as a circle, rectangle, oval, square, triangle, and the like.

"Input" generally refers to something put in, such as a physical substance put in (e.g. increased input of fuel), power or energy put into a machine or system usually with the intent of sizable recovery in the form of output, a component of production (such as land, labor, or raw materials), signals, data, or information fed into a computer, advice or comment, or a stimulus that acts on and is integrated into a bodily system. In the case of information fed into a computer, the input may be generated by a sensor detecting a sense parameter. In this instances, the time-varying values of the sense parameter are at least part of the input.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Motor" generally refers to a rotating machine that transforms electrical or chemical energy into mechanical energy, such as by a rotating shaft. Examples include electric motors and internal combustion engines.

"Movement" generally refers to an act of changing physical a physical property such as position, dimension, posture, angle of incidence, or location to name a few nonlimiting examples. Movement of an object may be caused by the object, by the activities of other objects acting on the object either directly or indirectly, and/or by the actions of environmental forces such as gravity, wind, and the like.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Optionally" as used herein means discretionary; not required; possible, but not compulsory; left to personal choice.

"Personal computing device" generally refers to a computing device configured for use by individual people. Examples include mobile devices such as Personal Digital Assistants (PDAs), tablet computers, wearable computers installed in items worn on the human body such as in eye glasses, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Predominately" as used herein is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qualcomm of San Diego, Calif., USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Retention Member" generally refers to an element, component, part, piece, or assembly configured to retain a first object in relation to a second object. The second object may be the retention member itself such as in the case of a retention member whose purpose is to hold itself in position relative to the first object. A retention member may be an assembly of multiple interrelated members that together operate as a retention member.

Examples of retention members include, but are not limited to, elongate structures such as a strap, chain, cable, wire, belt, string, and the like. A retention member may include coupling devices such as a snap, latch, coupler, clasp, or hook. Other examples include fasteners such as a screw, bolt, nail, brad, nut, or staple.

"Sense parameter" generally refers to a property of the environment detectable by a sensor. As used herein, sense parameter can be synonymous with an operating condition, environmental factor, sensor parameter, or environmental condition. Sense parameters may include temperature, air pressure, speed, acceleration, tension, weight, force, angle of deflection of an object with respect to another object or with respect to gravity, the presence or intensity of sound or light or other electromagnetic phenomenon, the strength and/or orientation of a magnetic or electrical field, and the like. Other examples include, hear rate, changes in location according to a location service such as the Global Positioning System (GPS), blood pressure, and the like.

"Sensor" generally refers to a transducer configured to sense or detect a characteristic of the environment local to the sensor. For example, sensors may be constructed to detect events or changes in quantities or sense parameters providing a corresponding output, generally as an electrical or electromagnetic signal. A sensor's sensitivity indicates how much the sensor's output changes when the input quantity being measured changes.

"Surround" as used herein means to "extend around at least a portion of" Implicit is a physical or conceptual perimeter around an object that is at least partially enclosed by another object, or arrangement of multiple objects. This includes to fully envelope, to enclose on all sides, and/or to extend fully around the margin or edge. The term may also contemplates intermittent spacing between placement of objects around a portion of another object, such as in the case of chairs that are said to surround a table, or police officers surrounding a building. The term also may be used in the abstract such as when a person's activities are surrounded by secrecy.

What is claimed is:

1. An automatic retention apparatus for an article of footwear comprising:
   a sensor configured to sense changes in a sense parameter based on movement of the article of footwear;
   a retention member surrounding at least a portion of the article of footwear, wherein the retention member is positioned adjacent to an outside surface of the article of footwear, wherein the retention member defines one or more holes passing through at least a portion of the retention member;
   an actuator that includes a gear with multiple teeth, the gear rotatable about an axis of rotation and positioned in the actuator so that at least one of the multiple teeth extend into the one or more holes of the retention member, wherein the actuator is coupled to the retention member adjacent an outside surface of the article of footwear, and wherein the gear is configured to adjust tension on the retention member as it rotates; and
   a processor responsive to input from the sensor and configured to control the actuator according to the input from the sensor, wherein the processor is configured to control the actuator to rotate the gear about the axis of rotation to adjust tension on the at least a portion of the article of footwear according to input from the sensor.

2. The automatic retention apparatus of claim 1, wherein the actuator, gear, processor, and at least a portion of the retention member are contained within a housing separate from and adjacent to the article of footwear.

3. The automatic retention apparatus of claim 1, wherein the article of footwear is mounted to a snow ski, or snow board.

4. The automatic retention apparatus of claim 1, wherein the retention member is arranged along a long axis that is substantially parallel to the axis of rotation of the gear.

5. The automatic retention apparatus of claim 1, the retention member is arranged along a long axis that is substantially perpendicular to the axis of rotation of the gear.

6. The automatic retention apparatus of claim 1, comprising:
   a braking mechanism coupled to the gear and configured to hold the gear from rotating.

7. The automatic retention apparatus of claim 1, wherein opposing ends of the retention member are mounted adjacent a sole region of the article of footwear, and wherein the actuator is mounted to the retention member adjacent a toe region of the article of footwear on a side of the article of footwear opposite the sole portion.

8. The automatic retention apparatus of claim 1, comprising:
   a memory storing configuration data of the actuator and historical data of past sensor output and changes to the tension on the retention member, wherein the processor is configured to determine a tension to apply to the retention member based on input from the sensor and the configuration data in the memory; and
   a wireless communication module controlled by the processor and configured to wirelessly communicate with a remote computer to receive configuration data and send the historical data.

9. The automatic retention apparatus of claim 7, comprising:
   a second retention member surrounding at least a portion of an ankle region of an article of footwear, wherein the second retention member is positioned adjacent to the outside surface of the article of footwear, wherein the second retention member defines one or more holes passing through at least a portion of the second retention member; and
   a second actuator that includes a second gear with multiple teeth, the second gear rotatable about a second axis of rotation and positioned in the actuator so that at least one of the multiple teeth of the second gear extend into the one or more holes of the second retention member, wherein the second actuator is coupled to the second retention member adjacent an outside surface of the ankle region of the article of footwear, and wherein the second gear is configured to adjust tension on the second retention member as it rotates;
   wherein the processor is configured to control the second actuator to rotate the second gear about the second axis of rotation to adjust tension on the ankle region of the article of footwear according to input from the sensor.

10. An automatic retention apparatus for automatically retaining a first object adjacent to a second object, comprising:
   a retention member coupled to the first object and surrounding at least a portion of the second object, wherein the retention member is mounted outside of the first object;
   an actuator that includes a rotating member rotatable about an axis of rotation, wherein the rotating member is outside the first object and coupled to the retention member, wherein the actuator rotates the rotating member in a first direction to increase a length of the retention member reducing tension on the retention member, and wherein the actuator rotates the rotating member in a second direction opposite the first direction to decrease the length of the retention member increasing tension on the retention member; and
   a processor responsive to input from at least one sensor and configured to control the actuator according to the input from the sensor, wherein the processor is configured to control the actuator to rotate the rotating member in the first or second direction to adjust tension on the retention member to automatically retain the first object adjacent to the second object based on input from the sensor;
   wherein the retention member is arranged along a long axis that is substantially parallel to the axis of rotation of the rotating member.

11. The automatic retention apparatus of claim 10, wherein the first object is an article of footwear configured to accept a foot inside the article of footwear.

12. The automatic retention apparatus of claim 10, wherein the first object is a container mounted to the second object.

13. The automatic retention apparatus of claim 10, wherein the retention member and the first object are separately mounted to a third object.

14. The automatic retention apparatus of claim 13, wherein the third object is any one of a surf board, kite board, ski, snow board, or skate board.

15. The automatic retention apparatus of claim 14, wherein the retention member defines one or more holes passing through at least a portion of the retention member, and wherein the rotating member is a gear with multiple teeth engaging the holes of the retention member.

16. The automatic retention apparatus of claim 10, wherein the first object is a wearable device, and wherein the at least one sensor is configured to sense changes in a sense parameter based on movement of the wearable device.

17. The automatic retention apparatus of claim 10, wherein the first object is a wearable device, and wherein the at least one sensor is configured to detect changes in a sense parameter caused by movement of a third object.

18. The automatic retention apparatus of claim 17, wherein the third object is coupled to the wearable device.

19. The automatic retention apparatus of claim 10, the retention member is arranged along a long axis that is substantially perpendicular to the axis of rotation of the rotating member.

* * * * *